(12) United States Patent
Windmuller et al.

(10) Patent No.: US 8,124,707 B2
(45) Date of Patent: Feb. 28, 2012

(54) PROCESS FOR THE PRODUCTION OF A POLYMER COMPRISING MONOMERIC UNITS OF ETHYLENE, AN A-OLEFIN AND A VINYL NORBORNENE

(75) Inventors: Peter Windmuller, Landgraaf (NL); Gerardus Van Doremaele, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 12/923,596

(22) Filed: Sep. 29, 2010

(65) Prior Publication Data

US 2011/0021732 A1    Jan. 27, 2011

Related U.S. Application Data

(62) Division of application No. 10/563,377, filed as application No. PCT/NL2004/000458 on Jun. 29, 2004, now Pat. No. 7,829,645.

(30) Foreign Application Priority Data

Jul. 9, 2003  (WO) ..................... PCT/NL03/00503

(51) Int. Cl.
  *C08F 210/18* (2006.01)
  *C08F 4/6592* (2006.01)
(52) U.S. Cl. ........ 526/339; 526/160; 526/161; 526/282; 526/336; 526/943
(58) Field of Classification Search .................. 526/160, 526/161, 282, 336, 339, 943
See application file for complete search history.

(56) References Cited

U.S. PATENT DOCUMENTS

| | | | |
|---|---|---|---|
| 4,871,705 A | 10/1989 | Hoel | |
| 5,132,380 A | 7/1992 | Stevens et al. | |
| 5,229,478 A | 7/1993 | Floyd et al. | |
| 5,491,207 A | 2/1996 | Hoel | |
| 5,696,213 A | 12/1997 | Schiffino et al. | |
| 6,063,879 A | 5/2000 | Stephan et al. | |
| 6,207,773 B1 | 3/2001 | Ting et al. | |
| 6,235,853 B1 | 5/2001 | McKay et al. | |
| 6,486,276 B1 | 11/2002 | Wang et al. | |
| 6,583,082 B2 | 6/2003 | Hoang et al. | |
| 6,806,336 B2 * | 10/2004 | Ravishankar | .............. 526/284 |
| 2003/0236363 A1 * | 12/2003 | Ravishankar | .............. 526/65 |

FOREIGN PATENT DOCUMENTS

| | | |
|---|---|---|
| CN | 1328066 A | 12/2001 |
| CN | 1839164 A | 9/2006 |
| EP | 0 374 695 A2 | 6/1990 |
| EP | 0 374 695 A3 | 6/1990 |
| EP | 0 708 117 B1 | 8/1999 |
| EP | 0 985 676 A1 | 3/2000 |
| EP | 1 162 214 A1 | 12/2001 |
| EP | 1 195 391 A1 | 4/2002 |
| EP | 1 339 788 B1 | 4/2007 |
| EP | 1 162 214 B1 | 10/2009 |
| JP | 9-241326 | 9/1997 |
| JP | 11-509881 | 8/1999 |
| JP | 2002-020414 | 1/2002 |
| JP | 2002-530492 | 9/2002 |
| JP | 2004-515593 | 5/2004 |
| WO | 97/01586 | 1/1997 |
| WO | 97/38019 | 10/1997 |
| WO | WO 97/38019 | 10/1997 |
| WO | 98/27103 A1 | 6/1998 |
| WO | 98/49212 A1 | 11/1998 |
| WO | 00/11048 | 3/2000 |
| WO | WO 00/11048 | 3/2000 |
| WO | 00/22005 A1 | 4/2000 |
| WO | 00/31155 | 6/2000 |
| WO | 00/69930 A1 | 11/2000 |
| WO | 01/14434 A1 | 3/2001 |
| WO | 02/46301 A1 | 6/2002 |
| WO | 02/070569 A1 | 9/2002 |
| WO | 2005/005496 A2 | 1/2005 |
| WO | 2005/005496 A3 | 1/2005 |

OTHER PUBLICATIONS

International Search Report mailed Sep. 7, 2005, 5 pages.
Katsunari Inagaki et al; "Diene-modified ethylene-.alpha.-olefin copolymers and their manufacture"; Database CA Online; Chemical Abstracts Service, Columbus, Ohio, US; Sep. 16, 1997, pp. 1-4.
Winfried P. Kretschmer et al; "A highly efficient titanium-based olefin polymerization catalyst with a monoanionic iminoimidazolidide .pi.-donor ancillary ligand"; Chemical Communications (Cambridge, United Kingdom), (6), 2002, pp. 608-609.
Harri Lasarov et al; "Ethylene-norbornene terpolymerization with 5-vinyl-2-norbornene using single-site catalysts"; Macromolecular Rapid Communications, 22(6), 2001, pp. 434-438.
EPO Communication (Summons to attend oral proceedings) issued in European Patent Application No. 04748688.1 dated Jan. 7, 2011, 10 pages.

\* cited by examiner

*Primary Examiner* — Caixia Lu
(74) *Attorney, Agent, or Firm* — Nixon & Vanderhye P.C.

(57) ABSTRACT

The invention relates to a process for the preparation of a polymer comprising monomeric units of ethylene, an α-olefin and a vinyl norbornene applying as a catalyst system: a. a bridged or an group 4 metal containing an unbridged catalyst having a single cyclopentadienyl ligand and a mono substituted nitrogen ligand, wherein said catalyst is defined by the formula (I): b. an aluminoxane activating compound, c. 0-0.20 mol per mol of the catalyst of a further activating compound, wherein Y is a substituted carbon or nitrogen atom. The invention further relates to a polymer obtainable with the process of the invention.

(I)

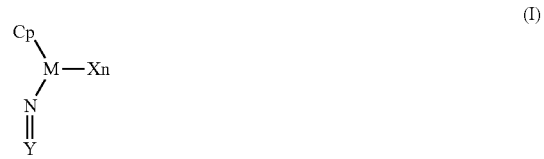

6 Claims, No Drawings

PROCESS FOR THE PRODUCTION OF A POLYMER COMPRISING MONOMERIC UNITS OF ETHYLENE, AN A-OLEFIN AND A VINYL NORBORNENE

This application is a Divisional of U.S. patent application Ser. No. 10/563,377 filed Apr. 27, 2006, now U.S. Pat. No. 7,829,645 which is the US national phase of international application PCT/NL2004/000458 filed 29 Jun. 2004 which designated the U.S. and claims benefit of PCT/NL03/00503, dated 9 Jul. 2003, the entire content of each of the above referenced patent applications is hereby incorporated by reference.

The invention relates to a process for the preparation of a polymer comprising monomeric units of ethylene, an α-olefin and a vinyl norbornene. The invention also relates to a polymer obtainable by the process of the invention.

Such a process and polymer are known from EP-A-765908. In this patent application a polymer consisting of ethylene, propylene and vinyl norbornene is described as well as various processes for the production the polymer. An advantage of the polymer comprising the monomeric units of vinyl norbornene is that it cures fast and to a high level when using a peroxide as a curative. For that reason it is desirable to use the polymer in rubber composition suitable for peroxide curing, like for instance rubber compositions used for the production of cable and wire, hoses for automotive applications, like for instance radiator hoses and hoses used in the braking system, thermoplastic elastomers and a wide variety of further rubber applications.

A serious disadvantage however is that in the production of the polymer comprising the vinyl norbornene using one of the known processes is that a high amount of branches is formed in the polymer and sometimes even gelation of the polymer takes place. Due to the high amount of branches the polymer has a broad molecular weight distribution. This is a disadvantage for the mechanical properties of a rubber comprising the polymer. If gelation occurs the polymer is partly or entirely crosslinked. The gelation is disadvantageous, as it causes the polymerization process to be unstable, reactor fouling to take place and the polymer to be not useful for use in a rubber composition intended for the production of shaped articles.

Object of the invention is to provide a process for the preparation of a polymer comprising monomeric units of ethylene, an α-olefin and a vinyl norbornene, the polymer showing less branches in terms of the dynamic mechanical quantity Δδ, defined in the following, and no or at least decreased risk for gelation.

Surprisingly such a process is obtained, because the polymer is prepared by using a catalyst system comprising as components:
a. an unbridged catalyst having a single cyclopentadienyl ligand and a mono substituted nitrogen ligand, wherein said catalyst is defined by the formula I:
b. an aluminoxane activating compound,
c. 0-0.20 mol per mol of the catalyst of a further activating compound,

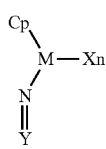

Form. I wherein Y is selected from the group consisting of:
ai) a phosphorus substituent defined by the formula:

Form. II wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

Form. III wherein each $R^2$ is independently selected from the group consisting of hydrogen, a $C_{1-8}$ alkyl or alkoxy radical, $C_{6-10}$ aryl or aryloxy radicals,
and a germanyl radical of the formula:

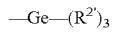

Form. IV wherein $R^{2'}$ is independently selected from the group consisting of hydrogen, a $C_{1-8}$ alkyl or alkoxy radical, $C_{6-10}$ aryl or aryloxy radicals,
aii) a substituent defined by the formula:

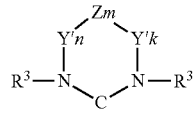

Form. V wherein each of Y'm, Y'k is C $R^3R^3$, C=C $R^3R^3$, C=$NR^3$, SiRR, C=O, $NR^3$, $PR^3$, O or S, Z is -A=A-, and each A is C $R^3$, N or P,
each $R^3$ is independently selected from the group of hydrogen, hydrocarbyl radical, silyl radical according to form. II or germanyl radical according to form. III,
k, m and n have independently the value 0, 1, 2 or 3, provided that k+m+n>0, and
aiii) a substituent defined by the formula:

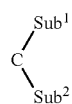

Form. VI wherein each of $Sub^1$ and $Sub^2$ is independently selected from the group consisting of hydrocarbyls having from 1 to 20 carbon atoms; silyl groups, amido groups and phosphido groups,
Cp is a ligand selected from the group consisting of cyclopentadienyl, substituted cyclopentadienyl, indenyl, substituted indenyl, fluorenyl and substituted fluorenyl;
Xm is an activatable ligand and n is 1 or 2, depending upon the valence of Δδ and the valence of X; and
M is a group 4 metal selected from the group consisting of titanium, hafnium and zirconium.

Surprisingly with the process according to the invention the polymer comprising the monomeric units of ethylene, the α-olefin and the vinyl norbornene shows considerable less long chain branching and no or hardly any gelation. A further advantage is that in the polymer obtained with the process according to the invention a larger portion of the vinyl norbornene is polymerized with only one of the two double bonds, the second double bond being available for the curing of the polymer. This results in a polymer being even more reactive to peroxide curing.

In a particular embodiment of the invention no further activating compound is used.

A process for the preparation of a polymer comprising monomeric units of ethylene, an α-olefin and non-conjugated diene, while using the above defined catalyst is described in EP-A-1162214. However in the document it is disadvised to use alominoxane as an activating compound and no attention is paid to the specific preparation of a polymer comprising vinyl norbornene.

Preferably 0-0.2 mol per mol of catalyst of further activating compound is used. Most preferably no further activating compound is used at all. In that case the aluminoxane is used as the sole activating compound.

The catalyst used in the process according to the invention preferably contains a phosphinimine ligand which is covalently bonded to the metal. This ligand is defined by the formula:

Form. VII

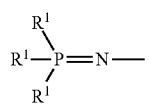

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula III, and a germanyl radical of the formula IV:

This ligand contains a "mono substituted nitrogen atom" in the sense that there is only one phosphorus atom (doubly) bonded to the nitrogen atom.

The preferred phosphinimines are those in which each R' is a hydrocarbyl radical. A particularly preferred phosphinimine is tri-(tertiary butyl) phosphinimine (i.e. where each R' is a tertiary butyl group).

As used herein, the term "ketimide ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) preferably has two substituents ($Sub^1$ and $Sub^2$, described below) which are bonded to the carbon atom as illustrated in Form. VIII.

Conditions a, b and c are illustrated below:

Form. VIII

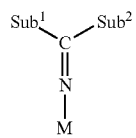

This ligand also contains a mono substituted nitrogen atom in the sense that only one carbon atom is (doubly) bonded to the nitrogen atom.

The substituents "$Sub^1$" and "$Sub^2$" may be the same or different. Exemplary substituents include hydrocarbyls having from 1 to 20 carbon atoms; silyl groups, amido groups and phosphido groups.

As used herein, the term cyclopentadienyl ligand is meant to broadly convey its conventional meaning, namely a ligand having a five carbon ring which is bonded to the metal via eta-5 bonding. Thus, the term "cyclopentadienyl" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula III and germanyl radicals of the formula IV:

The catalyst used in the process of this invention must also contain an activatable ligand. The term "activatable ligand" refers to a ligand, which may be activated by the aluminoxane activating compound (or the aluminoxane compound and eventually a minor portion of a further activating compound to facilitate olefin polymerization). Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{5-10}$ aryl or aryloxy radical, a silicium radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The preferred catalyst metals are Group 4 metals in their highest oxidation state (i.e. 4+) and the preferred activatable ligands are monoanionic (such as a hydrocarbyl group— especially methyl). Thus, the preferred catalyst contains a phosphinimine ligand, a cyclopentadienyl ligand and two chloride (or methyl) ligands bonded to the Group 4 metal. In some instances, the metal of the catalyst component may not be in the highest oxidation state. For example, a titanium (III) component would contain only one activatable ligand.

The most preferred catalysts for use in the process according to the invention are Group 4 organometallic complex in its highest oxidation state having a phosphinimine ligand, a cyclopentadienyl-type ligand and two activatable ligands. These requirements may be concisely described using the following formula for the preferred catalyst:

Form. IX

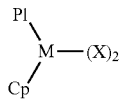

wherein: (a) M is a metal selected from Ti, Hf and Zr; (b) Pl is the phosphinimine ligand according to Form. VII as defined above. (c) Cp is a ligand selected from the group consisting of cyclopentadienyl, substituted cyclopentadienyl, indenyl, substituted indenyl, fluorenyl, substituted fluorenyl; and (d) X is an activatable ligand.

Aluminoxanes may be used as co catalysts and/or as a catalyst poison scavenger and/or as an alkylating agent. Most often the aluminoxane is a mixture of different organo aluminum compounds.

The alumoxane may be of the overall formula: $(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ radical and m is from 5 to 30. Methylalumoxane (or "MAO") in which most of the R groups in the compounds of the mixture are methyl is the preferred alumoxane.

Alumoxanes are also readily available articles of commerce generally as a solution in a hydrocarbon solvent.

The alumoxane, when employed, is preferably added at an aluminum to transition metal (in the catalyst) mole ratio of from 20:1 to 1000:1. Preferred ratios are from 50:1 to 250:1.

It is preferred to use a sterically bulky compound to enhance catalyst activity in the process of the present invention. Sterically bulky amines and/or sterically bulky alcohols are preferred. Hindered phenols are most preferred.

The process of the present invention may be a bulk polymerization process, a solution polymerization process or a slurry polymerization process.

The process of the present invention preferably is a solution process. Solution processes for the polymerization of ethylene propylene elastomers are well known in the art. These processes are conducted in the presence of an inert hydrocarbon solvent such as a $C_{5-12}$ hydrocarbon which may be unsubstituted or substituted by a $C_{1-4}$ alkyl group such as pentane, methyl pentane, hexane, heptane, octane, cyclohexane, methylcyclohexane and hydrogenated naphtha.

The process of this invention may be undertaken at a temperature of from 20° C. to 150° C. As previously noted, the use of a higher polymerization temperature will generally reduce solution viscosity (which is desirable) but also reduce molecular weight (which may be undesirable).

The monomers used in the process according to the invention for the preparation of the polymer may be dissolved/dispersed in the solvent either prior to being fed to the reactor (or for gaseous monomers the monomer may be fed to the reactor so that it will dissolve in the reaction mixture). Prior to mixing, the solvent and monomers are preferably purified to remove potential catalyst poisons such as water or oxygen. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the polymerization reactor. Additional monomers and solvent may be added to a second reactor (if employed) and the reactor(s) may be heated or cooled.

Generally, the catalyst components may be added as a separate solutions to the reactor or premixed before adding to the reactor.

The residence time-in the polymerization reactor will depend on the design and the capacity of the reactor. Generally the reactors should be operated under conditions to achieve a thorough mixing of the reactants. If two reactors in series are used, it is preferred that from 50 to 95 weight % of the final polymer is polymerized in the first reactor, with the balance being polymerized in the second reactor. It is also possible to use a dual parallel reactor setup. On leaving the reactor the solvent is removed and the resulting polymer is finished in a conventional manner.

It is also within the scope of this invention to use more than two polymerization reactors.

The invention also relates to the polymer obtainable by the process according to the invention. The invention also relates to compounds comprising the polymer obtainable by the process of the present invention, a plasticizer and a filler.

Due to the relatively high fraction of the vinyl norbornene non-conjugated diolefins that is polymerized with only one of the double bonds, the polymer comprises a lot of double bonds originating from the vinyl norbornene available for curing. It is known that the double bonds originating from the vinyl norbornene give a high curing speed; especially if a peroxide based curing system is used.

For these reasons it is very desirable to use the polymer of the present invention for the production in peroxide curing processes, preferably for the production of hoses, cable and wire covering, profiles and thermoplastic vulcanizates.

The polymer obtainable with the process of the present invention may contain monomeric units of one or more α-olefins having from 3 to for example 23 carbon atoms. Examples of such α-olefins are propylene, 1-butene, 1-pentene, 1-hexene and 1-octene. Preferably the polymer contains monomeric units of propylene as the α-olefin.

The polymers may have a weight average molecular weight of 10000 to 500000 kg/kmol. Preferably, the polymers have a weight average molecular weight of 20000 to 400000 kg/kmol, more preferably 50000 to 300000 kg/kmol.

The polymer for example contains 0.01-20 weight % vinyl norbornene, preferably 0.1-10 weight % mol. %, more preferably 0.2-6 weight %. Most preferably is a polymer which contains 1-5 weight % vinyl norbornene.

The preferred vinyl norbornene is 5-vinyl-2-norbornene. In one embodiment of the invention the polymer exists of ethylene, the α-olefin and the vinyl norbornene. In a second embodiment of the invention the polymer comprises ethylene, the α-olefin, the vinyl norbornene and a further non-conjugated diene, for example dicyclopentadiene, 1,4-hexadiene, 5-methylene-2-norbornene and 5-ethylidene-2-norbornene, preferably 5-ethylidene-2-norbornene.

Preferably the polymer comprises at least 0.01 weight % 5-ethylidene-2-norbornene, more preferably at least 0.05 weight %.

Preferably the polymer comprises from 40 to 90 weight % of ethylene, from 0.1 to 10 weight % of the non-conjugated dienes, the balance being the α-olefin.

Very good results are obtained if the polymer fulfills the following conditions:
[VNB]>0.01 and
$\Delta\delta$>30–15*[VNB], provided that $\Delta\delta$ is not negative, whereby [VNB] is the content of vinyl norbornene in the polymer in weight % and
$\Delta\delta$ is, expressed in degrees, the difference between the phase angle δ at a frequency of 0.1 rad/s and the phase angle δ at a frequency of 100 rad/s, as determined by Dynamic Mechanical Spectroscopy (DMS) at 125° C. This quantity $\Delta\delta$ is a measure for the amount of supermolecular (long chain branched) structures present in the material and has been introduced in H. C. Booij, Kautschuk+Gummi Kunststoffe, Vol. 44, No. 2, pages 128–130, which is incorporated herein by reference.

Preferably $\Delta\delta$>35–15*[VNB].

More preferably next to above conditions the polymer fulfils also the following condition:
$\Delta\delta$>25–12.5*(Q–2), wherein Q=Mw/Mn, Mw is the weight average molecular weight and Mn is the number average molecular weight.

Below, the invention will be elucidated on the basis of the following examples and comparative experiments, without being limited thereto.

Mw and Mn, Weight and Number Average Molecular Weight Analysis.

The elastomeric copolymers that were prepared as described in the examples were analyzed by means of Size Exclusion Chromatography and Differential Viscosimetry (SEC-DV) in accordance with the method described in the foregoing. All copolymers were elastomeric and in a DSC analysis they showed no peaks with a peak temperature higher than 25° C.

The equipment and the experimental conditions for this SEC-DV analysis were as follows:

Equipment: Waters M150c Gel Permeation Chromatograph (GPC) with DRI detector, used for Size Exclusion chromatography
    Viscotek Differential Viscometer (DV), model 100–02
    Detectors in parallel configuration with heated line interface (HLI)
    Erma solvent degasser ERC-3522
    LiChroma III pump pulse dampener (Viscotek) and high-sensitivity accessory (Waters)
Data processing: Viscotek data processing software, UNI-CAL 4.04 or higher version
Columns: Toyo Soda (TSK) GMHXL-HT mixed bed (4×)
Calibration: Universal calibration with linear polyethylene (PE) standard (molecular weight 0.4–4000 kg/mol)
Temperatures: Column oven 140° C.
    Injector compartment 150° C.
    Pump solvent compartment 60° C.
    DV oven 150° C.
SEC conditions: Flow: 1.0 ml/min
Injection volume: 0.300 ml
Solvent/eluent: Distilled 1,2,4-trichlorobenzene with about 1 g/l of Ionol stabilizer
Sample preparation: Dissolving for 4 hours at approx. 150° C.
    Filtration through 1.2 micron Ag filter
    Sample concentration approx. 1.0 mg/ml
Composition of the Polymers.

By means of Fourier transformation infrared spectroscopy (FT-IR), the composition of the copolymers was determined according to the method that is customary in the rubber industry. The FT-IR measurement gives the composition of the various monomers in weight per cents relative to the total composition.

Determination of $\Delta\delta$ by Dynamic Mechanical Spectroscopy. Dynamic mechanical experiments were performed with a Rheometric Scientific RDA-2 dynamic mechanical analyzer using an 8 mm parallel plate geometry to determine the linear viscoelastic properties of the materials. Test samples were compression molded at 150° C. (about 15 minutes) into 2 mm thick sheets, from which circular disks of 8 mm diameter were cut. At torsional strain amplitudes below 30%, the phase angle $\delta$ between stress and strain and the absolute value of the shear modulus $G_d$ were determined as a function of the angular frequency $\omega$ in between 0.1 and 100 rad/s. All measurements were performed at 125° C. under a nitrogen atmosphere. The presence of sufficient normal pressure on the sample to avoid slip was carefully checked. $\Delta\delta$ is, expressed in degrees, calculated from the difference between the phase angle $\delta$ at a frequency of 0.1 rad/s and the phase angle $\delta$ at a frequency of 100 rad/s.

ML(1+4) 125° C. is the Mooney viscosity, measured at 125° C.

Continuous Polymerisation Procedure.

The polymerization was carried out in one or two solution polymerization reactors in series (with a volume of 3 L each). The feed streams were purified by contacting with various absorption media to remove catalyst killing impurities such as water, oxygen and polar compounds as is known to those skilled in the art.

The process is continuous in all feed streams. Premixed hexane, propene, ethylene, dienes, hydrogen, aluminoxane and the sterically bulky amines and/or sterically bulky alcohols were precooled before being fed to the (first) reactor. The precatalyst, prepared according to the method described in U.S. Pat. No. 6,063,879 and references cited therein and WO-A-02/070569 and listed in table 1, and if applicable t-BF20 borate solution were separately fed to the (first) reactor. The polymer solution was continuously removed through a discharge line and worked-up by continuously steam stripping and subsequently a batch wise drying the polymer produced during a well-defined time on a mill.

The conditions and polymer data are presented in tables 2 and 3.

TABLE 1

Explanation of catalyst components.

| | |
|---|---|
| Cat 1 | Catalyst, $\eta^5$-(perfluorophenylcyclopentadienyl)(tri-tert-butylphosphinimine) titanium dichloride. |
| Cat 2 | Catalyst, $\eta^5$-(perfluorophenylcyclopentadienyl)(tri-tert-butylphosphinimine) titanium dimethyl. |
| Cat 3 | Catalyst, $\eta^5$-(cyclopentadienyl)(tri-iso-propylphosphinimine) titanium dimethyl. |
| Cat 4 | Catalyst, $\eta^5$-(cyclopentadienyl) 1,3-bis(2,6-dimethylphenyl)-iminoimidazoline titanium dimethyl |
| MMAO-7 | Modified methylaluminoxane purchased from AKZO-Nobel, the Netherlands. Typical Al content: 13.7 wt % in Isopar E. |
| BHT | 2,6-di-tert-butyl-4-methylphenol. |
| BHEB | 2,6-di-tert-butyl-4-ethylphenol. |
| t-BF$_{20}$ | Tritylium tetrakis (perfluorophenyl) borate, [CPh$_3$][B(C$_6$F$_5$)$_4$] |
| Cat A | Me$_2$SiC$_5$Me$_4$(N-t-Bu)TiMe$_2$ |
| Cat B | Cyclopentadienyl-9-(2,7-tert-butyl)fluorenyl-di(4-(triethylsilyl)phenyl)silane hafnium dimethyl |
| SEAC | Ethylaluminium sesquichloride |
| DCPAE | Dichlorophenyl acetic ethyl ester |

From the data in the tables it is clear that in the case of the examples according to the present invention more VNB can be incorporated for equal $\Delta\delta$ compared to the comparative examples that used a "high" amount of t-BF20 cocatalyst.

A (very) lower $\Delta\delta$ value is indicative of the presence of more (highly) branched polymer material. Gel formation is related to the presence of more, highly branched material.

EXAMPLE 1 VERSUS COMPARATIVE EXPERIMENT A

In example 1 the catalyst has been applied with MMAO-7 as catalyst activator. The produced EPDM polymer has a high VNB content and a relatively low degree of branching, in terms of $\Delta\delta$ of 18.5. The polymer of comparative experiment A, where BF20 had been applied as catalyst activator, under further similar conditions, had a significant lower VNB content whereas the degree of branching was higher resulting in a lower $\Delta\delta$ (12.1).

EXAMPLES 1 AND 2 VERSUS COMPARATIVE EXPERIMENTS A AND B

The phenomenon is independent of the reactor set up. In examples 1 and 2 MMAO-7 was used as catalyst activator. Example 1 had a single reactor set up (3 L), while example 2 had a two reactor set up in series (3 L+3 L). In these experiments both EPDM polymers had a high VNB content at a moderate degree of branching ($\Delta\delta$ of 18.5 and 15.5). In comparative experiments A and B BF20 was used as catalyst activator. Comparative experiment A had a one reactor set up (3 L), while comparative experiment B had a two reactor set up in series (3 L+3 L). In both experiments EPDM polymers were produced with low VNB content, resulting in a higher degree of branching (both with $\Delta\delta$ of 12.1). Examples 1, as well as examples 3, 6 and 7 show that in VNB generally leads to a lower $\Delta\delta$.

EXAMPLE 3

In example 3 an EPDM polymer was produced with an extreme high VNB content (4 wt %). The applied catalyst activator was MAO.

EXAMPLE 4 VERSUS COMPARATIVE EXPERIMENT C

In example 4 a EPDM polymer with very high VNB content (3.2) was produced with a MAO activated catalyst. In comparative experiment C a borate-activated catalyst was used under further the same conditions. Compared to comparative experiment C the VNB-content in Example 4 was approximately ten times as high to obtain an equal amount of branching, in terms of $\Delta\delta$ (9.0 and 8.6).

EXAMPLES 5, 7 AND 8

In examples 5 and 7 two different catalysts according to the invention were used and an activated MAO. In example 5 (Cat3) the VNB content is relatively high (1.3 wt %), while only a moderate degree of branching was obtained ($\Delta\delta$ of 20). In example 8 (Cat1) at a VNB content of 0.32 wt % a low branching level was obtained ($\Delta\delta$ of 30).

EXAMPLE 8 VERSUS COMPARATIVE EXPERIMENT C

In example 8 (MAO activated) and comparative experiment C (borate activated) two EPDM polymers were produced with almost equal VNB content (0.32 wt % and 0.34 wt %). In both cases catalyst 1 had been applied. The MAO activated example 8 was hardly branched ($\Delta\delta$ of 30), while the borate activated comparative example C was highly branched ($\Delta\delta$ of 8.6).

EXAMPLE 6

In example 6 BHEB was used instead of BHT. Also in this case, the VNB content was high (1.4 wt %) without a too high degree of branching ($\Delta\delta$ of 13).

EXAMPLE 7 VERSUS COMPARATIVE EXPERIMENT A

In example 7 (MAO activated) no BEHB or BHT has been used. The polymer was hardly branched ($\Delta\delta$ of 34). In comparative experiment A (borate activated) an EPDM polymer with the same VNB content was produced (0.29 wt %), having a considerably amount of branching ($\Delta\delta$ of 12.1).

EXAMPLE 9

In example 9 MMAO-7 was used. The produced EPDM polymer had a low VNB content, resulting in a low degree of branching, in terms of $\Delta\delta$ of 34.4.

EXAMPLES 10 AND 11

In examples 10 and 11 MMAO-7 was used in combination with Cat 4. The produced EPDM polymers had relatively high $\Delta\delta$ values for their VNB contents.

COMPARATIVE EXAMPLE D

Comparative example D demonstrates that a Vanadium based Ziegler Natta catalyst gives relative low $\Delta\delta$ at low VNB content (0.58 wt %). Compared to example 6 (with 1.42 wt % VNB) a similar $\Delta\delta$ is obtained at a lower VNB content.

COMPARATIVE EXAMPLE E

In comparative example E is shown that a relative low $\Delta\delta$ is obtained by using a borate and a particular Ti bases catalyst without any VNB added.

COMPARATIVE EXAMPLE F

In comparative example F is shown that a relative low $\Delta\delta$ is obtained at neglectible VNB content by using BF20 in combination with a particular Hf catalyst.

COMPARATIVE EXPERIMENT G

In comparative experiment G efforts were made to produce an EPDM polymer having a high VNB content applying a borate-activated catalyst. It was not possible to run such experiment under stable conditions without to much reactor fouling.

TABLE 2

| | | | | | | | | | | | | | Temp | Temp | |
| | | | | ENB | VNB | MMAO- | | | CoCat | | | Temp | °C. | °C. | Prod |
| | C6 | C2 | C3 | mmol/L | mmol/L | 7 | BHT | BHEB | t-BF20 | | Cat | °C. | 1st | 2nd | rate |
| | l/h | NL/h | g/h | C6 | C6 | mmol/h | mmol/h | mmol/h | mmol/h | Cat | mmol/h | feed | reactor | reactor | g/h |
|---|---|---|---|---|---|---|---|---|---|---|---|---|---|---|---|
| Ex. | | | | | | | | | | | | | | | |
| 1 | 18 | 905 | 1058 | 18.9 | 9.4 | 10.4 | 5.2 | — | | 2 | 0.057 | −25 | 90 | — | 1475 |
| 2 | 16.6 | 1119 | 1832 | 26.7 | 22.2 | 8.7 | 4.4 | — | | 2 | 0.012 | −24 | 91 | 89 | 1710 |
| 3 | 17.3 | 1048 | 1511 | 5.1 | 50.8 | 11 | 5.5 | — | | 2 | 0.046 | −26 | 90 | — | 1478 |
| 4 | 16.5 | 1001 | 2031 | 5.3 | 41.7 | 10.4 | 5.2 | — | | 2 | 0.029 | −25 | 89 | — | 1462 |
| 5 | 14.5 | 992 | 3313 | 66.5 | 19.9 | 6.18 | 11 | — | | 3 | 0.070 | −47 | 93 | — | 1930 |
| 6 | 17.3 | 1106 | 1596 | 27.6 | 18.6 | 4.3 | — | 4.1 | | 2 | 0.051 | −55 | 90 | — | 1979 |
| 7 | 17.2 | 1138 | 1349 | 20.3 | 3.4 | 3.6 | — | — | | 2 | 0.046 | −55 | 94 | — | 1763 |
| 8 | 18.1 | 900 | 1123 | 19.3 | 2.9 | 18.3 | 4.8 | — | | 1 | 0.546 | −26 | 89 | — | 1408 |

TABLE 2-continued

Polymerisation conditions

| | C6 l/h | C2 NL/h | C3 g/h | ENB mmol/L C6 | VNB mmol/L C6 | MMAO-7 mmol/h | BHT mmol/h | BHEB mmol/h | CoCat t-BF20 mmol/h | Cat | Cat mmol/h | Temp °C. feed | Temp °C. 1st reactor | Temp °C. 2nd reactor | Prod rate g/h |
|---|---|---|---|---|---|---|---|---|---|---|---|---|---|---|---|
| 9 | 18.1 | 899 | 1125 | 19.0 | 3.8 | 7.87 | 4.0 | — | — | 2 | 0.013 | −25 | 89.7 | — | 1500 |
| 10 | 15.2 | 566 | 1426 | 4.0 | 53.2 | 10.4 | 5.2 | — | — | 4 | 0.008 | 10 | 71 | — | 712 |
| 11 | 18.1 | 900 | 1124 | 21.1 | 7.8 | 5.2 | 2.6 | — | — | 4 | 0.028 | −29 | 90 | — | 1481 |
| Comparative experiments | | | | | | | | | | | | | | | |
| A | 18 | 897 | 1136 | 19.1 | 2.8 | 3.28 | 1.64 | — | 0.01 | 2 | 0.007 | −25 | 91 | — | 1476 |
| B | 18 | 844 | 1132 | 17.4 | 2.6 | 3.28 | 1.6 | — | 0.03 | 2 | 0.010 | −24 | 89 | 81 | 1478 |
| C | 18.1 | 836 | 1139 | 19.2 | 3.8 | 3.94 | 1.87 | — | 0.02 | 1 | 0.008 | −25 | 92 | — | 1516 |
| D | 15.1 | 855 | 3180 | 24.2 | 8.1 | — | — | — | — | V cat system* | | | −55 | 52 | — | 1247 |
| E | 18.0 | 969 | 523 | 32.3 | — | 4.34 | 2.16 | — | 0.039 | Cat A | 0.026 | −36 | 82 | — | 1419 |
| F | 18.1 | 975 | 516 | 24.3 | 0.8 | 1.93 | 0.97 | — | 0.02 | Cat B | 0.014 | −25 | 90 | — | 1362 |
| G | Failed attempt to run a polymerisation process | | | | | | | | | | | | | | |

*Vanadium based Ziegler Natta cat system consisted of 1.63 SEAC mmol/l C6, 0.055 mmol/lC6 VOCl3 and 0.22 mmol/lC6 DCPAE

TABLE 3 polymer characterisation data

| | Wt % C2 | Wt % ENB | Wt % VNB* | ML(1 + 4) 125° C. | MSR | Mw Kg/mol | Mw/Mn | Mz/Mw | Δδ |
|---|---|---|---|---|---|---|---|---|---|
| Example | | | | | | | | | |
| 1 | 65.9 | 2.54 | 1.12 | 68 | 0.53 | 260 | 3.2 | 3.4 | 18.5 |
| 2 | 67.3 | 2.34 | 1.65 | 66 | 0.55 | 245 | 2.9 | 3.1 | 15.5 |
| 3 | 67.6 | 0.59 | 4.04 | 59 | 0.43 | 280 | 4.5 | 5.0 | 1.5 |
| 4 | 62.8 | 0.57 | 3.22 | 28 | 0.55 | 215 | 3.9 | 5.3 | 9.0 |
| 5 | 54.6 | 5.29 | 1.33 | 78 | 0.50 | 280 | 3.0 | 3.3 | 20.2 |
| 6 | 65.0 | 2.32 | 1.42 | 63 | 0.52 | 240 | 3.7 | 3.8 | 13.4 |
| 7 | 72.6 | 2.19 | 0.28 | 64 | 1.05 | 190 | 2.2 | 2.1 | 45.3 |
| 8 | 67.3 | 2.46 | 0.32 | 60 | 0.85 | 210 | 2.4 | 2.2 | 29.6 |
| 9 | 69.8 | 2.26 | 0.40 | 63 | 0.90 | 205 | 2.1 | 2.1 | 34.4 |
| 10 | 60.0 | 0.43 | 4.99 | 58 | 0.53 | 1600 | 17.8 | 6.1 | 10.8 |
| 11 | 66.2 | 2.35 | 0.75 | 68 | 0.77 | 310 | 3.5 | 5.3 | 28.4 |
| Comparative experiments | | | | | | | | | |
| A | 66.7 | 2.51 | 0.29 | 64 | 0.57 | 230 | 2.6 | 2.5 | 12.1 |
| B | 61.8 | 2.40 | 0.29 | 60 | 0.55 | 215 | 2.6 | 2.5 | 12.1 |
| C | 66.9 | 2.15 | 0.34 | 60 | 0.44 | 260 | 5.9 | 3.2 | 8.6 |
| D | 65.7 | 2.43 | 0.58 | 66 | 0.58 | 225 | 2.5 | 2.3 | 13.6 |
| E | 66.3 | 2.83 | 0 | 61 | 0.58 | 190 | 2.4 | 1.9 | 7.9 |
| F | 68.5 | 2.34 | bdl | 68 | 0.63 | 240 | 2.5 | 2.1 | 16.4 |
| G | It was not possible to run an experiment at high VNB feed using t-BF20 as activator in an appropriate way. Even during the start up, the experiment failed, due to fouling by gelation. | | | | | | | | |

*: [VNB] as single Incorporated VNB, measured by FT-IR
bdl: below detection limit, no VNB detected by FT-IR

The invention claimed is:

1. A polymer comprising monomeric units of ethylene, an α-olefin and a vinyl norbornene, wherein
   $5 \geq [VNB] > 1$ and
   $\Delta\delta > 30-15*[VNB]$, provided that $\Delta\delta$ is not negative,
   [VNB] is the content of vinyl norbornene in the polymer in weight % and
   $\Delta\delta$ is, expressed in degrees, the difference between the phase angle δ at an angular frequency of 0.1 rad/s and the phase angle δ at an angular frequency of 100 rad/s, as measured by dynamic mechanical spectroscopy, at a temperature of 125° C.

2. Polymer according to claim 1, wherein $\Delta\delta > 35-15*[VNB]$.

3. The polymer of claim 1, wherein $5 \geq [VNB] \geq 1.12$.

4. Polymer according to claim 1, wherein $\Delta\delta > 25-12.5*(Q-2)$, wherein Q=Mw/Mn; Mw is the weight average molecular weight; and Mn is the number average molecular weight.

5. Polymer according to claim 2, wherein $\Delta\delta > 25-12.5*(Q-2)$, wherein Q=Mw/Mn; Mw is the weight average molecular weight; and Mn is the number average molecular weight.

6. Polymer according to claim 3, wherein $\Delta\delta > 25-12.5*(Q-2)$, wherein Q=Mw/Mn; Mw is the weight average molecular weight; and Mn is the number average molecular weight.

* * * * *